United States Patent
Nation et al.

(10) Patent No.: US 9,755,540 B2
(45) Date of Patent: Sep. 5, 2017

(54) APPARATUS, SYSTEM AND METHOD FOR PROVIDING POWER ANYWHERE IN A RETAIL STORE ENVIRONMENT

(71) Applicant: TARGET BRANDS INC., Minneapolis, MN (US)

(72) Inventors: Gary Nation, Plymouth, MN (US); Doyle Trankel, Apple Valley, MN (US)

(73) Assignee: Target Brands Inc., Minneapolis, MN (US)

(*) Notice: Subject to any disclaimer, the term of this patent is extended or adjusted under 35 U.S.C. 154(b) by 367 days.

(21) Appl. No.: 14/697,858

(22) Filed: Apr. 28, 2015

(65) Prior Publication Data

US 2016/0013727 A1    Jan. 14, 2016

Related U.S. Application Data

(60) Provisional application No. 62/024,160, filed on Jul. 14, 2014.

(51) Int. Cl.
  *H02M 7/00*   (2006.01)
  *H05B 33/08*  (2006.01)
  *H02J 9/06*   (2006.01)

(52) U.S. Cl.
  CPC ........ *H02M 7/003* (2013.01); *H05B 33/0803* (2013.01); *H02J 9/061* (2013.01)

(58) Field of Classification Search
  CPC ...... H02M 7/003; H05B 33/0803; H02J 9/061
  USPC ......................................................... 307/151
  See application file for complete search history.

(56) References Cited

U.S. PATENT DOCUMENTS

2008/0013351 A1* 1/2008 Alexander .......... H02M 3/1582
                                                      363/123

OTHER PUBLICATIONS

Brochure regarding RELOC modular wiring solutions by Acuity Brands Lighting, Inc., Conyers, GA; 2011 (12 pages).

* cited by examiner

*Primary Examiner* — Robert Deberadinis
(74) *Attorney, Agent, or Firm* — Hamre, Schumann, Mueller & Larson, P.C.

(57) ABSTRACT

A voltage conversion apparatus for providing power anywhere within, for example, a retail store environment is provided. The voltage conversion apparatus includes a mounting structure that can mount the apparatus near a ceiling of the retail store environment. Also, the voltage conversion apparatus includes a voltage converter for converting voltage from an existing high voltage power source. The voltage conversion apparatus is configured to connect to the existing high voltage power source, convert the voltage from the power source and deliver the converted voltage to any location within the retail store environment. The voltage conversion apparatus is also configured to be modular and can be quickly, easily and safely mounted to different locations of the retail store environment as needed.

23 Claims, 6 Drawing Sheets

Figure 1:
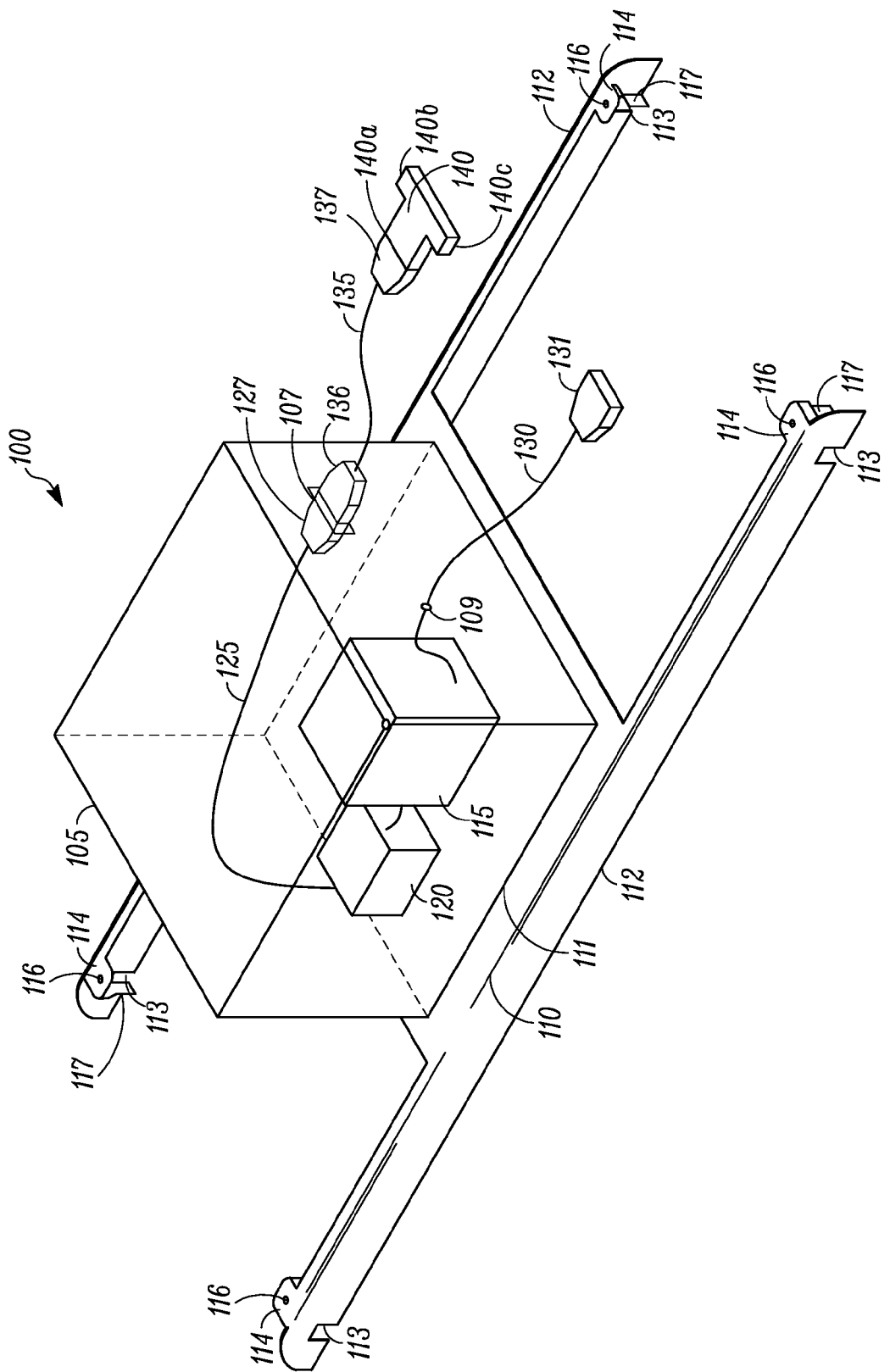

APPARATUS, SYSTEM AND METHOD FOR PROVIDING POWER ANYWHERE IN A RETAIL STORE ENVIRONMENT

BACKGROUND

Providing power to various locations in, for example, a retail store environment is an ongoing problem. Typically, when a new location in the retail store environment requires power, e.g., to power a gondola or sales display, an electrician is required to put in a power pole that feeds from an existing power source. However, providing a new power pole on the sales floor can be expensive and requires an electrician for safe installation. Also, once the power pole is installed it is difficult to remove and typically remains a permanent addition to the retail store environment.

SUMMARY

In order to save energy and reduce costs, retail store environments are increasingly switching to light fixtures that use less electrical power. Accordingly, the existing high voltage circuitry used to power these new light fixtures has excess power capacity that typically remains unused. The embodiments described herein can use this untapped power to provide power anywhere in the retail store environment to power, for example, gondolas, sales displays, cash registers, light emitting diode (LED) lighting, sales floor electronic devices and appliances, etc.

In particular, an apparatus, system and method for providing power anywhere in, for example, a retail store environment are described herein. An installer (e.g., an employee such as a store facility technician) can quickly, easily and safely mount a voltage conversion apparatus to provide power anywhere in the retail store environment. Also, an installer can later quickly, easily and safely move the voltage conversion apparatus from one location within the retail store environment to another location within the retail store environment. Accordingly, the retail store environment can be modified to provide power where required as needs within the retail store environment change.

In one embodiment, a voltage conversion apparatus for providing power anywhere is provided. The voltage conversion apparatus includes a mounting structure that can mount the apparatus near an existing high voltage power source. Also, the voltage conversion apparatus includes a voltage converter for converting voltage from the existing high voltage power source. The voltage conversion apparatus is configured to connect to the existing high voltage power source, convert the voltage from the power source and deliver the converted voltage to any location required. The voltage conversion apparatus is also configured to be modular and can be quickly, easily and safely mounted to different locations of the retail store environment as needed.

In another embodiment, a voltage converter for providing power anywhere within a store is provided. The voltage converter includes voltage conversion means, casing means, attachment means, adapter means, input connecting means and output connecting means. The voltage conversion means for providing voltage conversion of electricity from an existing voltage power source. The casing means for housing the voltage conversion means. The attaching means for supporting the casing and attaching the voltage converter near a ceiling of the store. The adapter means for connecting to the existing voltage power source of the store. The input connecting means for electrically connecting the adapter means and the voltage conversion means, the input connecting means inputting high voltage power to the voltage conversion means. The output connecting means for directing a converted voltage power from the voltage conversion means to an end use device.

In yet another embodiment, a method for providing power anywhere within a store is provided. The method includes mounting a support structure of a conversion device to a ceiling structure of the store. The conversion device includes the support structure, a power converter, an output connection, and a connector. The method also includes disconnecting a portion of an existing circuit. The method further includes connecting one end of the disconnected portion of the existing circuit to the connector of the conversion device. Also, the method includes connecting another end of the disconnected portion of the existing circuit to the connector. Moreover, the method includes routing an output connection of the conversion device to an end use device.

Also, in another embodiment, a system for providing power anywhere within a building is provided. The system includes an electrical power circuit and a power converter device. The electrical power circuit is provided near a ceiling of the building and configured to provide power along the ceiling of the building. The power converter device includes an attaching portion configured to mount the power converter device near the ceiling of the building. The power converter device also includes a connecting portion configured to connect to the electrical power circuit. Further, the power converter device includes a voltage modifier configured to modify a voltage of the power from the electrical power circuit.

DRAWINGS

FIG. 1 illustrates a voltage conversion apparatus according to one embodiment.

FIGS. 2A-D illustrate different implementations of a voltage conversion apparatus within a retail store environment.

Figure 3:
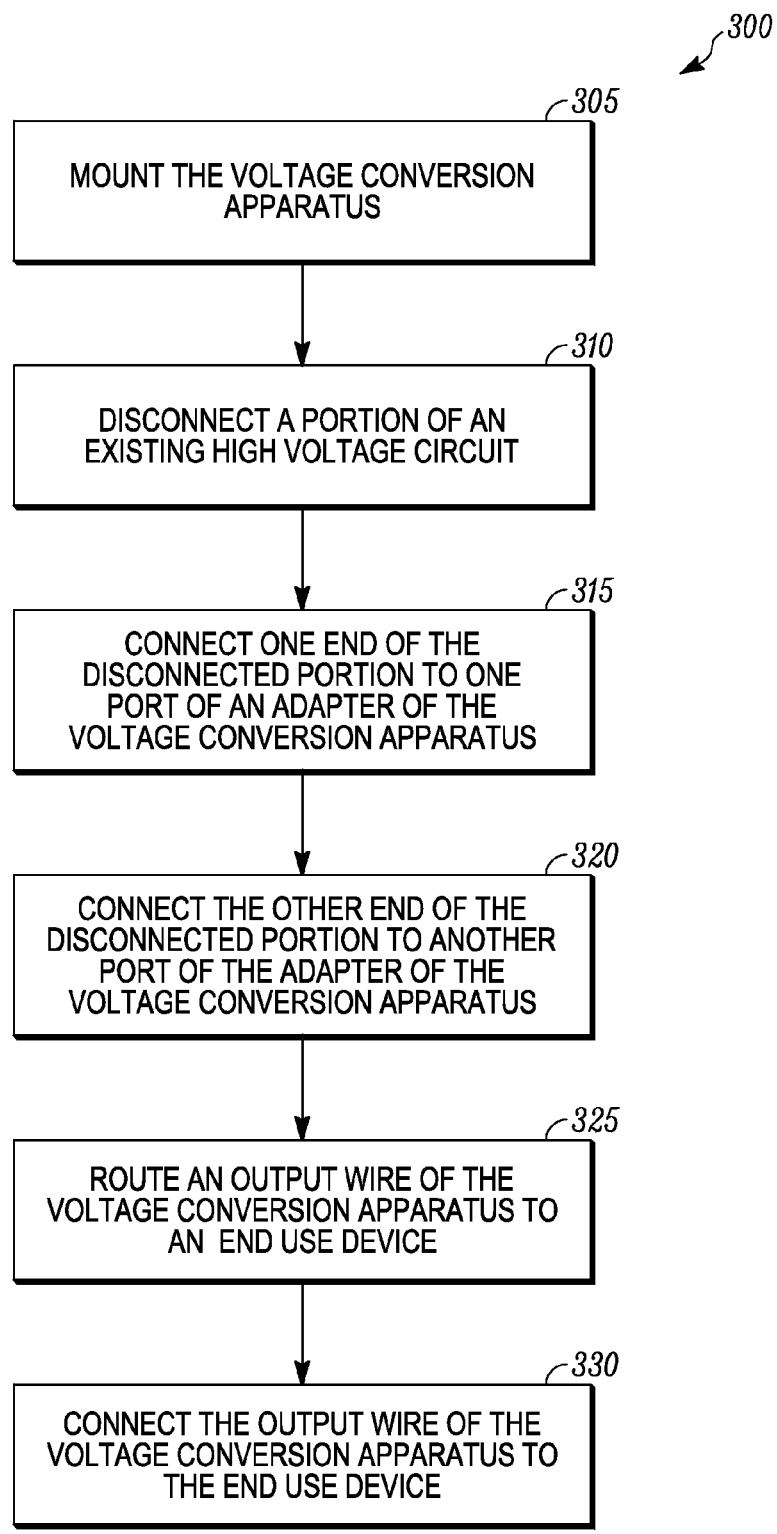

FIG. 3 illustrates a flow chart for providing power anywhere in a retail store environment, according to one embodiment.

DETAILED DESCRIPTION

An apparatus, system and method for providing power anywhere in, for example, a retail store environment are described herein.

While the embodiments discussed below are directed to a retail store environment, it will be appreciated to one skilled in the art that the embodiments described herein can also be applied to, for example, a stock room environment, a warehouse environment, an office space environment, etc. In fact, the embodiments described herein can be provided in any location near an existing voltage power source.

A retail store environment, as described herein, can refer to, for example, a retail store. The retail store environment can include, for example, a sales floor that includes one or more aisles that can include shelves to stock merchandise, one or more marketing displays and sales floor fixtures (e.g., a gondola), one or more checkout lines where a point of sale can occur (e.g., where customers can pay for merchandise), etc.

In a retail store environment, for example, an installer (e.g., an employee such as a store facility technician) can quickly, easily and safely mount a voltage conversion apparatus to provide power anywhere in the retail store environment. Also, an installer can later quickly, easily and safely move the voltage conversion apparatus from one location within the retail store environment to another location within the retail store environment. Accordingly, an electrician is not necessary to mount or remove the voltage conversion apparatus.

In particular, the voltage conversion apparatus described herein can connect to an existing high voltage circuit, convert the voltage from the existing high voltage circuit, and relay the converted voltage to one or more end use devices anywhere within the retail store environment. In the embodiments discussed below, the voltage conversion apparatus is connected to an existing high voltage circuit and to an end use device via a modular or plug and play wiring system with, for example, pre-manufactured connectors (e.g., a wiring system with connectors for simple connection between wires such as RELOC® Wiring Solutions from Acuity Brands Lighting, Dual-Lite™ wiring solutions from Hubbell Lighting, Inc., etc.).

However, it will be appreciated to those skilled in the art that the voltage conversion apparatus can connect to an existing high voltage circuit and to an end use device via other wiring systems, including a conduit wiring system (a wiring system with tubing for protecting and routing one or more wires), or via one or more separate wires and/or cables (for example, wires and cables without tubing). For example, a conduit wiring system may be implemented when, for example, a modular wiring system is prohibited by local building code zones. It will also be appreciated to those skilled in the art that a wire and/or cable (e.g., an input cable, an output cable, input wire, output wire, etc.) as described herein can refer to a modular cable compatible with a modular wiring system, a conduit wiring system, one or more separate wires and/or cables, etc.

With reference initially to FIG. 1, a voltage conversion apparatus 100 is illustrated. The voltage conversion apparatus 100 is a modular apparatus that can provide power anywhere within a retail store environment via a modular wiring system. The voltage conversion apparatus 100 includes a housing 105 provided on a mounting structure 110. In some embodiments, the voltage conversion apparatus 100 is configured to connect to an existing high voltage circuit of a building (e.g., a retail store environment).

The housing 105 houses a voltage converter 115 connected to a circuit breaker 120. The voltage converter 115 is configured to convert a high voltage input to a different voltage level and/or into a different voltage form. In some embodiments, the housing 105 can include air vents (not shown) to provide air ventilation within the housing 105. Also, in some embodiments, the housing 105 can also include a fan (not shown) for cooling the voltage converter 115 and the circuit breaker 120.

The voltage converter 115 can include, but is not limited to, one or more of a voltage transformer (not shown), an LED driver (not shown) and an uninterruptible power supply (UPS) (not shown). The voltage transformer can be, for example, a two winding transformer (e.g., with one or more winding(s) for a primary voltage and/or one or more windings for a secondary voltage), an autotransformer (e.g., with a secondary voltage that is tapped off of one or more primary winding(s)), etc.

The voltage converter 115 is configured to provide an output voltage at a required output voltage level. The output voltage level of the voltage converter 115 can vary based on, for example, how and where the voltage conversion apparatus 100 is to be used, voltage drop requirements, etc. In some embodiments, the voltage converter 115 can be configured to provide an output voltage at a specific output voltage level. In other embodiments, the output voltage level of the output voltage provided by the voltage converter 115 can be adjustable.

For example, in some embodiments, the voltage converter 115 can include a step down voltage transformer that is configured to convert a high alternating current (AC) voltage (e.g., 277 V AC) into a lower AC voltage (e.g., 120 V AC). In some embodiments, the voltage converter 115 can include a voltage transformer that is configured to convert the high AC voltage into a different high AC voltage (e.g., 220-240 V AC). In some embodiments, the voltage converter 115 can include a voltage transformer with a rectifier that is configured to convert the high AC voltage into a lower direct current (DC) voltage (e.g., 12-24 V DC).

In some embodiments, the voltage converter 115 can include an LED driver that is configured to convert a high AC voltage into a lower DC that is suitable voltage for powering, for example, LED lights, etc.

In other embodiments, the voltage converter 115 can include a UPS that is configured to store high AC voltage that can be later used to provide short-term voltage when necessary.

The circuit breaker 120 is configured to protect the voltage converter 115 and wiring within the voltage conversion apparatus 100 from damage caused by an overload or short circuit. The circuit breaker 120 is also configured to act as a power limiter that limits the amount of power load placed on an existing high voltage circuit to which the voltage conversion apparatus 100 is connected. The circuit breaker 120 is sized to control the maximum amount of power that can be used by the voltage conversion apparatus 100 at any time. Accordingly, in some embodiments, where the amount of power available from the existing high voltage circuit is limited, an installer (e.g., an employee such as a sales floor technician) can plan and control the number of voltage conversion apparatuses that are connected to the existing high voltage circuit at any given time to ensure that the existing high voltage circuit is not overloaded. Thus, the circuit breaker 120 can act as a safety device for both the voltage conversion apparatus 100 and for an existing high voltage circuit to which the voltage conversion apparatus 100 is connected. It will be appreciated that the type and characteristics of the circuit breaker 120 can vary based on how and where the voltage conversion apparatus 100 is to be used. For example, when the voltage converter 115 include an LED driver, the circuit breaker 120 can be configured, for example, to allow a high inrush current.

The housing 105 includes an input aperture 107 and an output aperture 109 located on the same surface of the housing 105. The input aperture 107 is configured to allow an input cable 125, provided inside the housing 105 and connected at one end to the circuit breaker 120, to connect to a second connector 136 outside of the housing 105. The output aperture 109 is configured to allow an output cable 130 connected to the voltage converter 115 to exit out of the housing 105. In other embodiments, the input aperture 107 can be located at one surface of the housing 105 and the output aperture 109 located at another surface of the housing 105 adjoining or opposite to the surface where the input aperture 107 is located. It will be appreciated to those skilled in the art that the input aperture 107 and the output aperture 109 can each be located at any surface of the housing 105.

The input cable 125 includes a connector 127. The input cable 125 is connected to a modular cable 135. In particular, the connector 127 is configured to connect to a first connector 136 of the modular cable 135. The modular cable 135 also has a second connector 137 that is connected to an adapter 140. The adapter 140 is a T-connector that includes three ports 140a,b,c, with port 140a connected to the second connector 137 and the ports 140b,c configured to connect to an existing high voltage circuit. It will be appreciated to those skilled in the art that in some embodiments the modular cable 135 is not necessary and the connector 127 can be connected directly to one of the ports 140a,b,c of the adapter 140.

In some embodiments, the existing high voltage circuit can be provided for powering light fixtures within a retail store environment and can use modular wiring having connectors to connect to the light fixtures. In these embodiments, the adapter 140 allows a store facility technician to disconnect a connection between light fixtures of the existing high voltage circuit, connect the two disconnected connectors of the existing high voltage circuit to the ports 140b and 140c respectively, and connect the connector 137 of the modular cable 135 to the port 140a. Accordingly, high voltage power from the existing high voltage circuit can be directed to the voltage converter 115.

The output cable 130 is configured to direct a converted voltage from the voltage converter 115 to an electronic device or circuit that requires the converted voltage. The output cable 130 is a modular cable that includes a connector 131 that is configured to connect to an electronic device or circuit.

While the circuit breaker 120 shown in FIG. 1 is connected to the voltage converter 115 at a line side of the voltage converter 115 (e.g., the circuit breaker 120 connecting the input cable 125 to the voltage converter 115), it will be appreciated that in some embodiments, the circuit breaker 120 can be connected to the voltage converter 115 at a load side of the voltage converter 115 (e.g., the circuit breaker 120 connecting the voltage converter 115 to the output cable 130). Also, in some embodiments, the voltage conversion apparatus 100 can include a first circuit breaker connected to the voltage converter 115 at a line side of the voltage converter 115 and a second circuit breaker connected to the voltage converter 115 at a load side of the voltage converter 115.

The mounting structure 110 is configured to support the housing 105 and mount onto a ceiling grid of a retail store environment (see FIGS. 2A-D). The mounting structure 110 includes a support plate 111 and two identical support rails 112. The housing 105 is disposed on the support plate 111. In some embodiments, the housing 105 can be fixed or attached to the support plate 111. In other embodiments, the housing 105 can be movably attached to the support plate 111. Also, in some embodiments, the housing 105 can be integral with the support plate 111. The support plate 111 is attached to the support rails 112. In some embodiments, the support plate 111 can be integral with the support rails 112. In other embodiments, the support plate 111 can be fixed or attached to the support rails 112. The support rails 112 are positioned generally parallel to each other along opposite ends of the support plate 111.

Each of the support rails 112 includes mounting notches 113 that are each configured to mount on a span bar of a ceiling grid of the retail store environment. In particular, each of the notches 113 is configured to rest on a top portion of a span bar of the ceiling grid. Accordingly, the installer can easily mount the voltage conversion apparatus 100 to the ceiling grid. It will be appreciated to those skilled in the art that the voltage conversion apparatus 100 is configured to have a size and weight that meets building code regulations that allow it to mount onto the ceiling grid. It will be appreciated to those skilled in the art that in some embodiments, the support rails 112 can also include one or more fastening mechanisms (e.g., clips, screws, rivets, nuts and bolts, seismic support cables, etc.) (not shown) configured to provide a more secure mounting of the voltage conversion apparatus 100 to the span bar ceiling grid. The one or more fastening mechanisms can vary based on where the voltage conversion apparatus 100 is to be mounted amongst other parameters including, for example, a ceiling track design, seismic code requirements, etc.

A horizontal protrusion 114 and a vertical protrusion 117 are provided adjacent to each of the notches 113. The horizontal protrusions 114 and the vertical protrusions 117 are configured to provide stability and support for the support rails 112 when the notches 113 are mounted on the span bars of the ceiling grid structure. The horizontal protrusions 114 each include an opening 116. In some embodiments, the openings 116 can be configured to allow the one or more fastening mechanisms to secure the support rails 112 to the span bars of the ceiling grid structure. The one or more fastening mechanisms can vary based on where the voltage conversion apparatus 100 is to be mounted amongst other parameters including, for example, a ceiling track design, seismic code requirements, etc.

It will be appreciated to those skilled in the art that the mounting structure 110 can also be mounted, for example, in a portion of a retail store environment that does not include a ceiling grid system such as a stock room. In these embodiments, the mounting structure 110 can be connected to one or more supports, such as cables, rods or other support members that extend from a true ceiling. In some embodiments, the mounting structure 110 can be mounted to two supports extending from a true ceiling. Accordingly, the voltage conversion apparatus 100 can be suspended from the true ceiling of the stock room or other part of the retail store environment not having a ceiling grid system. It will also be appreciated to those skilled in the art that the mounting structure 110 can also be mounted, for example, to a wall of the stock room, retail store environment, etc.

FIGS. 2A-D illustrate different implementations of a voltage conversion apparatus 200a-d within a retail store environment. The voltage conversion apparatuses 200a-d are similar to the voltage conversion apparatus 100 shown in FIG. 1. Differences between the voltage conversion apparatuses 200a-d from the voltage conversion apparatus 100 are described below.

Figure 2A:
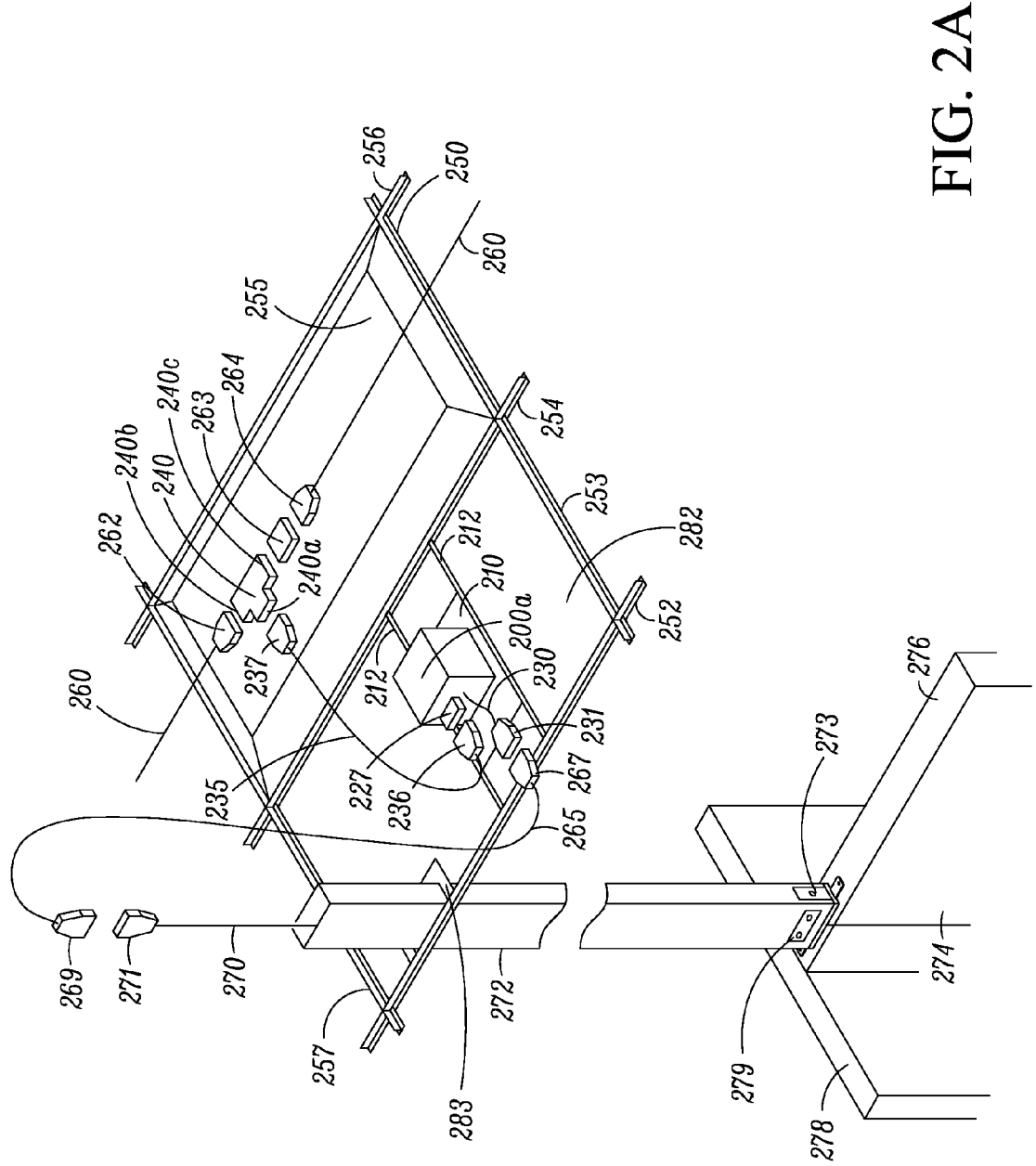
Figure 2B:
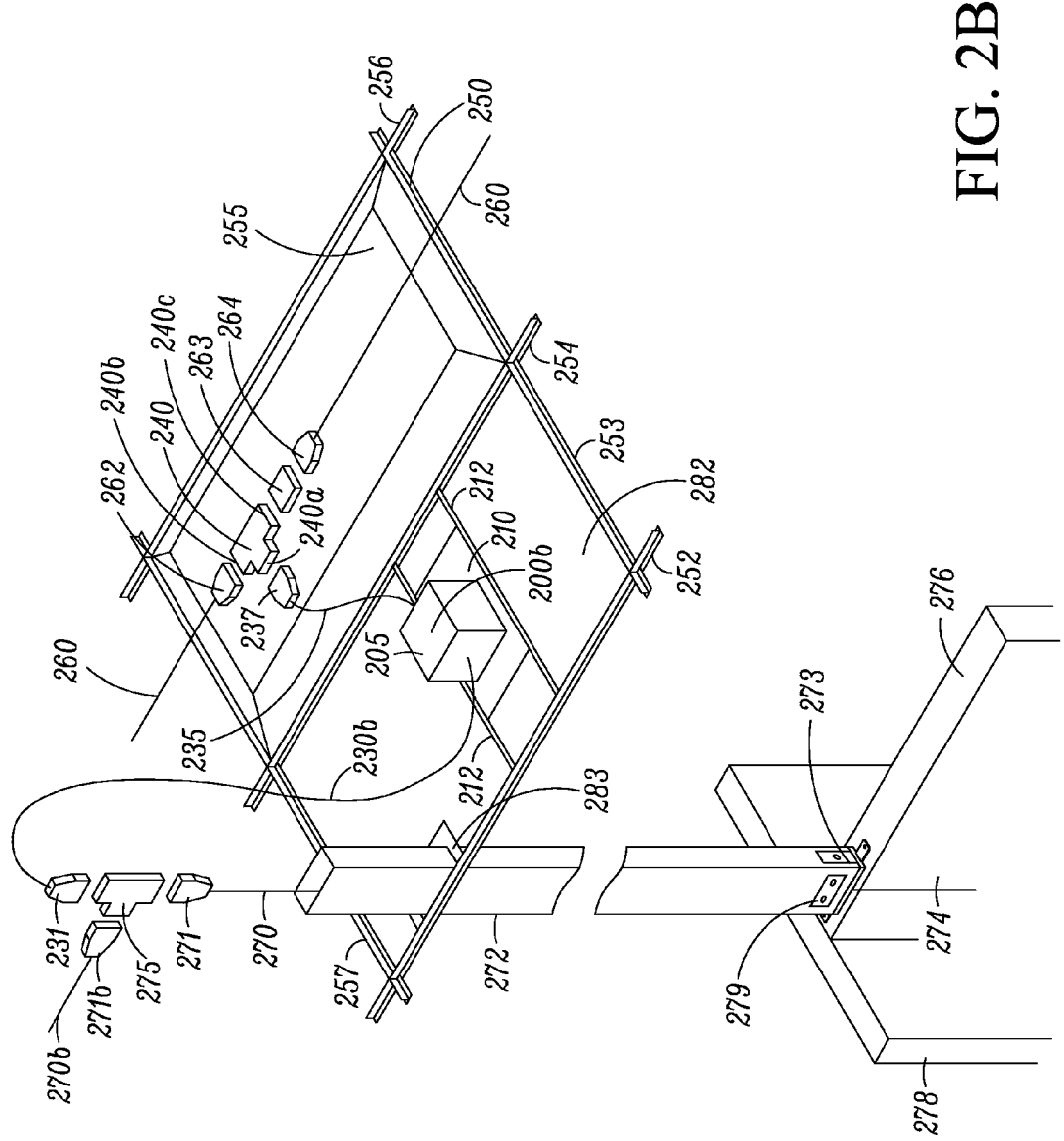

Each of the voltage conversion apparatuses 200a-d is mounted to a ceiling grid 250 of a retail store environment. The ceiling grid 250 includes a plurality of span bars including span bars 252, 254, 256 that run generally parallel to each other and span bars 253, 257 that run generally perpendicular to the span bars 252, 254, 256. The ceiling grid 250 also includes a plurality of ceiling tiles including a ceiling tile 282. The plurality of span bars is configured to support a plurality of light fixtures, including the light fixture 255, and a plurality of ceiling tiles, including the ceiling tile 282. As shown in FIGS. 2A and 2B, the ceiling tile 282 can include an opening 283.

A mounting structure 210 of the voltage conversion apparatuses 200a-d includes support rails 212. The support rails 212 are configured to mount the voltage conversion apparatus 200a-d to the span bars 252, 254. In some embodiments, the support rails 212 can be identical to the support rails 112 shown in FIG. 1 and can mount to the span bars 252, 254 in the same manner.

An existing high voltage circuit 260 runs across and above the light fixture 255 and is configured to provide power to the light fixture 255. The existing high voltage circuit 260 uses a modular wiring system that includes connectors 262, 264. The light fixture 255 includes a connector 263 that is configured to connect to the existing high voltage circuit 260 so as to provide power to the light fixture 255. It will be appreciated to those skilled in the art that in embodiments where a modular wiring system is not provided, the connector 263 can be an electrical junction box to allow the light fixture 255 to be connected to the existing high voltage circuit 260. In some embodiments, the existing high voltage circuit 260 can provide high AC voltage (e.g., 277 V AC) to power to the light fixture 255.

An adapter 240 of the voltage conversion apparatus 200a-d is a T-connector that includes ports 240a,b,c and is configured to connect to the existing high voltage circuit 260. In particular, the port 240b is configured to connect to the connector 262 and the port 240c is configured to connect to the connector 263. The port 240a is configured to connect to a connector 237 of a modular cable 235 of the voltage conversion apparatus 200a-d. Accordingly, the voltage conversion apparatus 200a-d can receive power from the existing high voltage circuit 260 without interfering with the existing high voltage circuit 260 from providing power to the light fixture 255 via the connector 263.

Each of the voltage conversion apparatuses 200a-d is configured to convert high AC voltage from the existing high voltage circuit 260 into lower AC voltage. In particular, the voltage conversion apparatuses 200a-d include a step down voltage transformer (not shown) that is configured to step down the high AC voltage power to a lower AC voltage (e.g., 120 V AC).

It will be appreciated to those skilled in the art that in other embodiments the voltage conversion apparatuses 200a-d can include a voltage transformer that is configured to convert a high AC voltage into a different high AC voltage (e.g., 220-240 V AC). In other embodiments, the voltage conversion apparatuses 200a-d can include a voltage transformer with a rectifier that is configured to convert a high AC voltage into a lower direct current (DC) voltage (e.g., 12-24 V DC).

Also, in some embodiments, the voltage conversion apparatuses 200a-d can include an LED driver that is configured to convert a high AC voltage into a lower DC voltage for powering, for example, LED lights, etc.

Further, in other embodiments, the voltage conversion apparatuses 200a-d can include a UPS that is configured to store high AC voltage that can be later used to provide short-term voltage when necessary.

The voltage conversion apparatuses 200a-d can also include a circuit breaker (not shown) that is configured to protect the voltage conversion apparatuses 200a-d from damage caused by an overload or short circuit. This allows the circuit breaker to limit the amount of power load placed on the existing high voltage circuit 260.

With respect to FIG. 2A, the voltage conversion apparatus 200a includes a connector 227 configured to connect to a connector 236 of the modular cable 235. The modular cable 235 is configured to direct high voltage AC power from the high voltage circuit 260 to the step down voltage transformer of the voltage conversion apparatus 200a in order to step down the high AC voltage to a lower AC voltage.

The lower AC voltage is then directed out of the voltage conversion apparatus 200a via an output cable 230. In this embodiment, the output cable 230 is a modular cable that includes a connector 231. The connector 231 is configured to connect to a connector 267 of a modular cable 265. In this embodiment, the connector 227 and the output cable 230 are provided on the same surface of the voltage conversion apparatus 200a.

The modular cable 265 is configured to route the lower AC voltage to a modular cable 270. In particular, the modular cable 265 includes a connector 269 that is configured to connect to a connector 271 of the modular cable 270.

The modular cable 270 is routed through a power pole 272 vertically downward towards a sales floor fixture 274 (e.g., gondola). The sales floor fixture 274 includes a wall 276 and a wall 278 that is generally perpendicular to the wall 276. The power pole 272 is configured to pass through the ceiling tile 282 via the opening 283 and connect to a top surface of the wall 276 via a bracket 273. The power pole 272 includes a junction box (not shown) with an outlet 279. From there, an end use device can plug into the outlet 279 to receive lower AC voltage from the voltage conversion apparatus 200a.

In other embodiments, the modular cable 270 can be configured to be routed to feed into a receptacle (not shown) located near a bottom of the power pole 272. In yet some other embodiments, the modular cable 270 can be configured to be routed to a junction box (not shown) at a base deck of the sales floor fixture 274.

The end use device can be, for example, a low wattage device (e.g., less than 500 Watts) such as a gondola, a sales display, signage, a computer, a cash register, track lighting, a light emitting diode (LED) device, etc. In embodiments where the voltage conversion apparatus 200a generates high AC voltage, the end use device can be a high wattage device (e.g., 500 Watts or greater) such as an appliance, a heater component, etc. that requires the high AC voltage in order to operate.

With respect to FIG. 2B, the voltage conversion apparatus 200b includes an output cable 230b extending from a housing 205 of the voltage conversion apparatus 200b. Also, the modular cable 235 and the output cable 230b are provided on opposite surfaces of the housing 205. The modular cable 235 is configured to direct high voltage AC power from the high voltage circuit 260 to the step down voltage transformer of the voltage conversion apparatus 200b in order to step down the high AC voltage to a lower AC voltage.

The lower AC voltage is then directed out of the voltage conversion apparatus 200b via the output cable 230b. In this embodiment, the output cable 230b is a modular cable that includes the connector 231. The output cable 230b is configured to route the lower AC voltage to a port of an adapter 275.

The adapter 275 is a T-connector with three ports for connecting the output cable 230b to the modular cable 270 and a modular cable 270b. In particular, the T-connector includes three ports with one port connected to each of the connector 231 of the output cable 230b, the connector 271 of the modular cable 270, and the connector 271b of the modular cable 270b. The modular cable 270b can be used to provide the lower AC voltage from the voltage conversion apparatus 200c to another end use device (not shown).

The modular cable 270 is routed through the power pole 272 vertically downward towards the sales floor fixture 274 (e.g., gondola). The sales floor fixture 274 includes the wall 276 and the wall 278 that is perpendicular to the wall 276. The power pole 272 is configured to pass through the ceiling tile 282 via the opening 283 and connect to a top surface of the wall 276 via a bracket 273. The power pole 272 includes a junction box (not shown) with an outlet 279. From there, an end use device can plug into the outlet 279 to receive lower AC voltage from the voltage conversion apparatus 200*b*.

In other embodiments, the modular cable 270 can be configured to be routed to feed into a receptacle (not shown) located near a bottom of the power pole 272. In yet some other embodiments, the modular cable 270 can be configured to be routed to a junction box (not shown) at a base deck of the sales floor fixture 274.

Figure 2C:
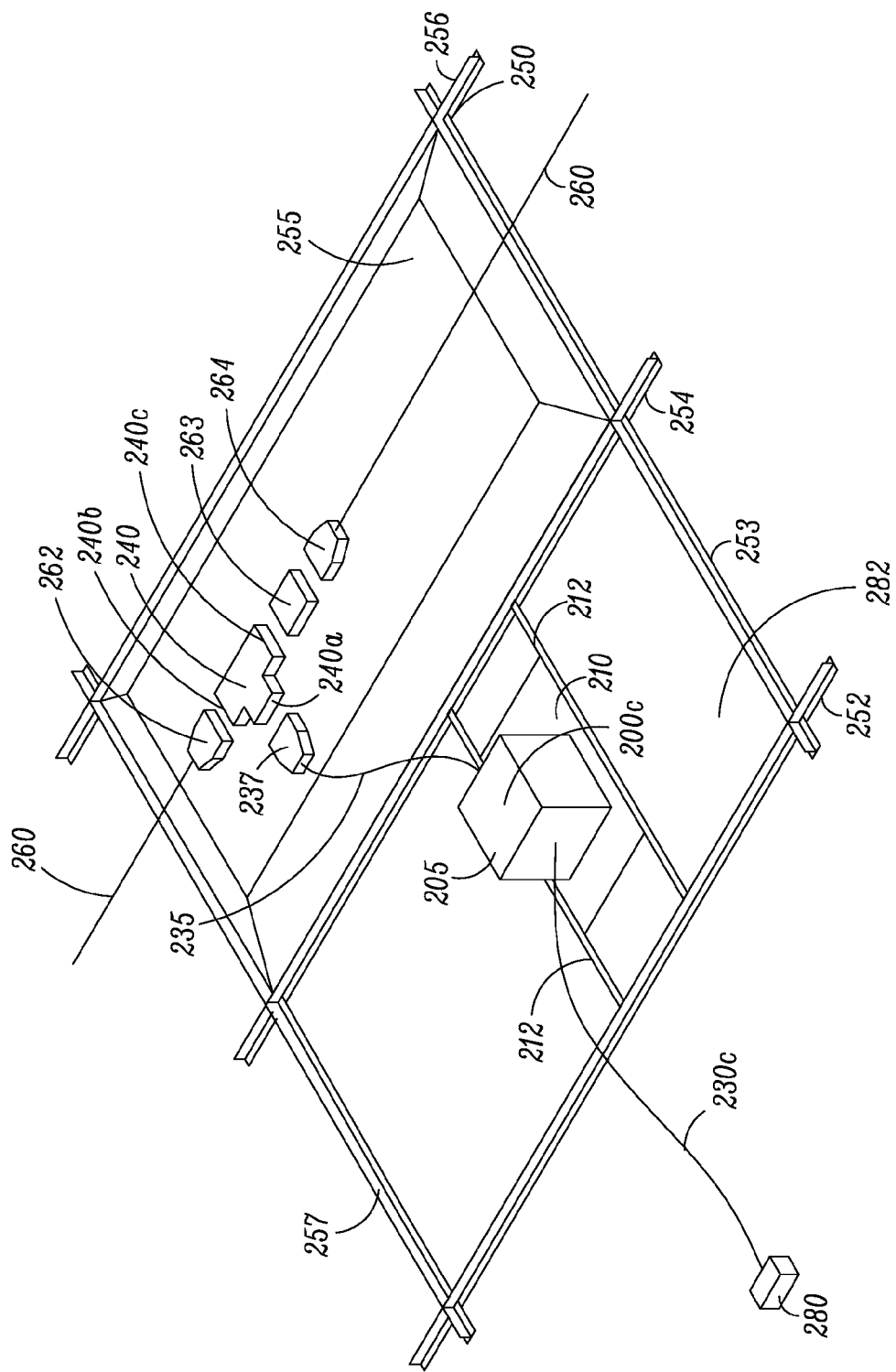

With respect to FIG. 2C, the voltage conversion apparatus 200*c* includes an output cable 230*c* extending from the housing 205 of the voltage conversion apparatus 200*c*. Also, the modular cable 235 and the output cable 230*c* are provided on opposite surfaces of the housing 205. The modular cable 235 is configured to direct high voltage AC power from the high voltage circuit 260 to the step down voltage transformer of the voltage conversion apparatus 200*c* in order to step down the high AC voltage to a lower AC voltage.

The lower AC voltage is then directed out of the voltage conversion apparatus 200*c* via the output cable 230*c*. In this embodiment, the output cable 230*c* is connected directly to an in store marketing (ISM) device 280 to provide the lower AC voltage for powering the ISM device 280.

Figure 2D:
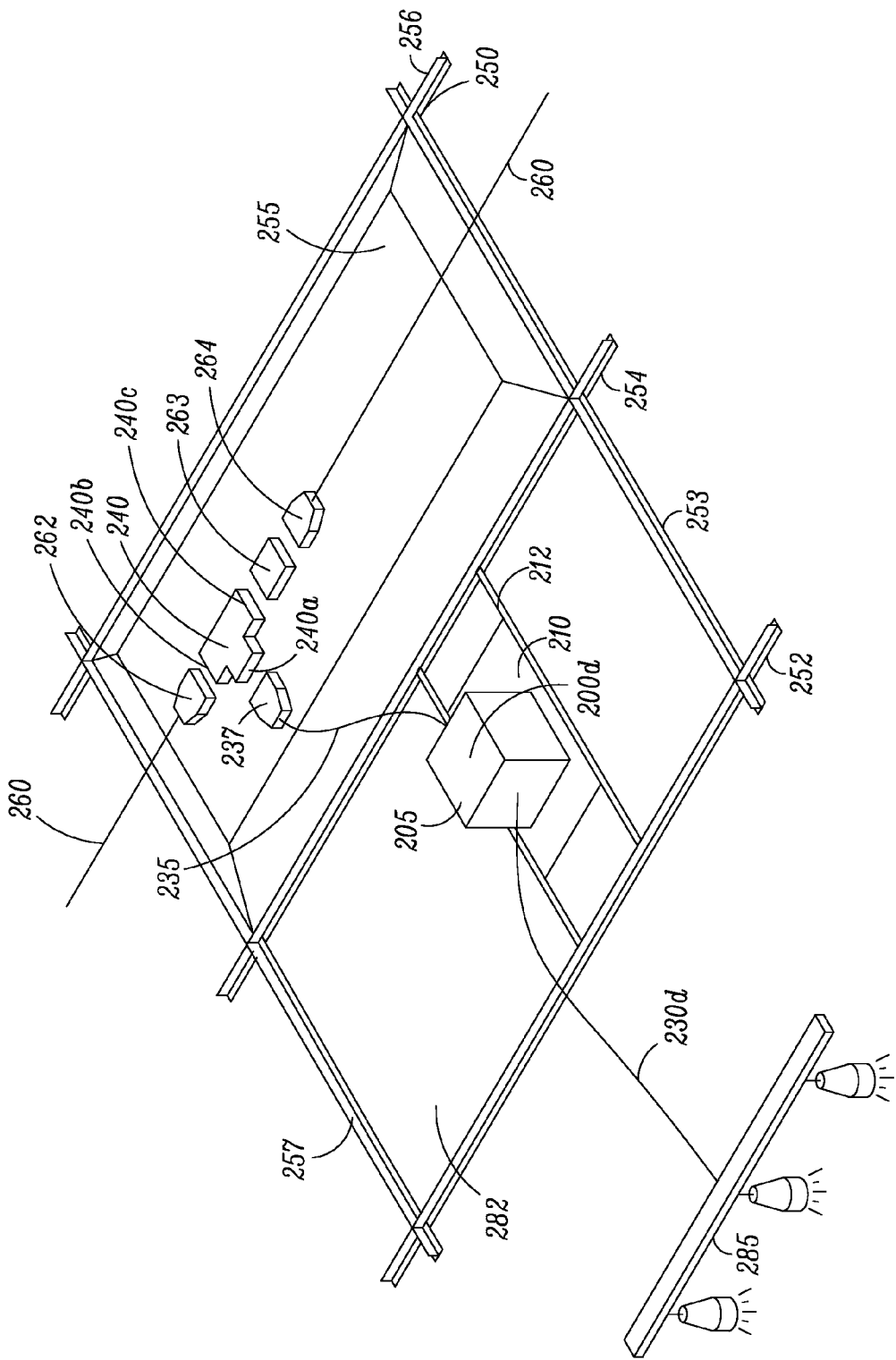

With respect to FIG. 2D, the voltage conversion apparatus 200*d* includes an output cable 230*d* extending from the housing 205 of the voltage conversion apparatus 200*d*. Also, the modular cable 235 and the output cable 230*d* are provided on opposite surfaces of the housing 205. The modular cable 235 is configured to direct high voltage AC power from the high voltage circuit 260 to the step down voltage transformer of the voltage conversion apparatus 200*d* in order to step down the high AC voltage to a lower AC voltage.

The lower AC voltage is then directed out of the voltage conversion apparatus 200*d* via the output cable 230*d*. In this embodiment, the output cable 230*d* is connected directly to a track lighting device 285 to provide the lower AC voltage for powering the track lighting device 285.

FIG. 3 illustrates a flow chart of a process 300 for providing power anywhere in a retail store environment, according to one embodiment. At 305, an installer (e.g., a store facility technician, an electrician, etc.) mounts a voltage conversion apparatus (e.g., the voltage conversion apparatus 100, 200*a-d*) near a ceiling of a location of the retail store environment where power is required. In some embodiments, the voltage conversion apparatus can be mounted to one or more span bars of a ceiling grid. In other embodiments, the voltage conversion apparatus can be mounted near a true ceiling (e.g., in a stock room of the retail store environment) by suspending the voltage conversion apparatus by a plurality of supports.

At 310, an installer disconnects a portion of an existing high voltage circuit adjacent to a position of the voltage conversion apparatus. When the existing high voltage circuit is routed through the retail store environment using a modular wiring system, the installer can simply disconnect a modular connection near the location of the voltage conversion apparatus. When the existing high voltage circuit is routed through the retail store environment using a standard wiring system, the installer can cut a wire of the existing high voltage circuit near the location of the voltage conversion apparatus.

It will be appreciated to those skilled in the art that when a modular wiring system is used, the installer used to implement the process 300 can be, for example, a store facility technician and an electrician. When a standard wiring system is used, a store facility technician may not be properly trained to implement the process 300 and the installer can be, for example, an electrician.

At 315, an installer connects one end of the disconnected portion of the existing high voltage circuit to an adapter of the voltage conversion apparatus. When the existing high voltage circuit is routed through the retail store environment using a modular wiring system, the installer can simply connect one connector of the modular connection to one port of the adapter. When the existing high voltage circuit is routed through the retail store environment using a standard wiring system, the installer can wire a disconnected end of the existing high voltage circuit to one port of the adapter.

At 320, an installer connects the other end of the disconnected portion of the existing high voltage circuit to the adapter of the voltage conversion apparatus. When the existing high voltage circuit is routed through the retail store environment using a modular wiring system, the installer can simply connect the other connector of the modular connection to another port of the adapter. When the existing high voltage circuit is routed through the retail store environment using a standard wiring system, the installer can wire the other disconnected end of the existing high voltage circuit to another port of the adapter.

At 325, an installer routes an output wire of the voltage conversion apparatus towards an end use device that requires power. At 330, the installer connects the output wire of the voltage conversion apparatus to the end use device. In some embodiments, the output wire of the voltage conversion apparatus is directly connected to the end use device. In other embodiments, the output wire of the voltage conversion apparatus is connected to the end use device via, for example, one or more modular cables, a junction box, etc.

It will be appreciated to those skilled in the art that an installer can quickly, easily and safely remove the voltage conversion apparatus by simply disconnecting the output wire of the voltage conversion apparatus from the end use device, disconnecting the adapter of the voltage conversion apparatus from the existing high voltage circuit and removing the voltage conversion apparatus. An installer can then reconnect the disconnected ends of the high voltage energy circuit. The removed voltage conversion apparatus can then be installed at any other location that requires power.

Thus, as described herein, a voltage conversion apparatus for providing power anywhere near an existing power source is provided. The voltage conversion apparatus includes a mounting structure that can mount the apparatus to a structure near the existing power source. Also, the voltage conversion apparatus includes a voltage converter for converting voltage from an existing high voltage power source. The voltage conversion apparatus is configured to connect to the existing high voltage power source, convert the voltage from the power source and deliver the converted voltage to any location required. The voltage conversion apparatus is also configured to be modular and can be quickly, easily and safely mounted to different locations as needed.

Also, as described herein, a voltage converter for providing power anywhere within a store is provided. The voltage converter includes voltage conversion means, casing means, attachment means, adapter means, input connecting means and output connecting means. The voltage conversion means for providing voltage conversion of electricity from an existing voltage power source. The casing means for housing the voltage conversion means. The attaching means for supporting the casing and attaching the voltage converter near a ceiling of the store. The adapter means for connecting to the existing voltage power source of the store. The input connecting means for electrically connecting the adapter means and the voltage conversion means, the input connecting means inputting high voltage power to the voltage conversion means. The output connecting means for directing a converted voltage power from the voltage conversion means to an end use device.

Further, as described herein, a method for providing power anywhere within a store is provided. The method includes mounting a support structure of a conversion device to a ceiling structure of the store. The conversion device includes the support structure, a power converter, an output connection, and a connector. The method also includes disconnecting a portion of an existing circuit. The method further includes connecting one end of the disconnected portion of the existing circuit to the connector of the conversion device. Also, the method includes connecting another end of the disconnected portion of the existing circuit to the connector. Moreover, the method includes routing an output connection of the conversion device to an end use device.

Moreover, as described herein, a system for providing power anywhere within a retail shop is provided. The system includes an electrical power circuit and a power converter device. The electrical power circuit is provided near a ceiling of the retail shop and configured to provide power along the ceiling of the retail shop. The power converter device includes an attaching portion configured to mount the power converter device near the ceiling of the retail shop. The power converter device also includes a connecting portion configured to connect to the electrical power circuit. Further, the power converter device includes a voltage modifier configured to modify a voltage of the power from the electrical power circuit.

The described embodiment(s) may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A voltage conversion apparatus for providing power anywhere, the voltage conversion apparatus comprising:
    a housing that includes a voltage converter disposed therein, the voltage converter configured to provide voltage conversion of an existing high voltage power source;
    a mounting structure configured to support the housing and configured to mount the voltage conversion apparatus to a location near the existing high voltage power source;
    an adapter configured to connect to the existing high voltage power source;
    an input cable connected to the adapter and the voltage converter and configured to input high voltage power to the voltage converter; and
    an output cable connected to the voltage converter and configured to direct a converted voltage power from the voltage converter to an end use device.

2. The voltage conversion apparatus of claim 1, wherein the voltage converter includes a step down voltage transformer configured to convert a primary alternating current (AC) voltage into a secondary AC voltage that is lower than the primary AC voltage.

3. The voltage conversion apparatus of claim 2, wherein the primary AC voltage is about 277 volts AC and the secondary AC voltage is about 120 volts AC.

4. The voltage conversion apparatus of claim 1, wherein the voltage converter includes a step down voltage transformer and a rectifier that are configured to convert a primary alternating current (AC) voltage into a secondary direct current (DC) voltage that is lower than the primary AC voltage.

5. The voltage conversion apparatus of claim 1, wherein the voltage converter includes a liquid emitting diode (LED) driver that is configured to convert a primary alternating current (AC) voltage into a secondary direct current (DC) voltage.

6. The voltage conversion apparatus of claim 1, wherein the voltage converter includes an uninterruptible power supply (UPS) that is configured to store a high alternating (AC) voltage power from the existing high voltage power source.

7. The voltage conversion apparatus of claim 1, further including a circuit breaker disposed in the housing and connected to the voltage converter.

8. The voltage conversion apparatus of claim 1, wherein the mounting structure includes a support plate configured to support the housing and a plurality of support rails attached to the support plate, the plurality of support rails configured to mount the voltage conversion apparatus to the location near the existing high voltage power source.

9. The voltage conversion apparatus of claim 8, wherein the location near the existing high voltage power source is a ceiling grid, and wherein the plurality of support rails includes a plurality of notches sized and spaced to rest on a plurality of span bars of the ceiling grid.

10. A voltage converter for providing power anywhere within a store, the voltage converter comprising:
    voltage conversion means for providing voltage conversion of electricity from an existing voltage power source;
    casing means for housing the voltage conversion means;
    attaching means for supporting the casing and attaching the voltage converter near a ceiling of the store;
    adapter means for connecting to the existing voltage power source of the store;
    input connecting means for electrically connecting the adapter means and the voltage conversion means, the input connecting means inputting high voltage power to the voltage conversion means; and
    output connecting means for directing a converted voltage power from the voltage conversion means to an end use device.

11. A method for providing power anywhere within a store, the method comprising:
    mounting a support structure of a conversion device to a ceiling structure of the store, the conversion device including the support structure, a power converter connected to an output connection and connected to a connector;
    disconnecting a portion of an existing circuit;
    connecting a first end of the portion of the existing circuit to the connector of the conversion device;
    connecting a second end of the portion of the existing circuit to the connector; and
    routing the output connection of the conversion device to an end use device.

12. The method of claim 11, further comprising connecting the output cable to the end use device.

13. The method of claim 11, further comprising routing the existing circuit through the store via a modular cable scheme.

14. A system for providing power anywhere within a building comprising:
  an electrical power circuit provided near a ceiling of the building and configured to provide power along the ceiling of the building;
  a power converter device that includes an attaching portion configured to mount the power converter device near the ceiling of the building, a connecting portion configured to connect to the electrical power circuit and receive power from the electrical power circuit, and a voltage modifier configured to modify a voltage of the power from the electrical power circuit.

15. The system of claim 14, wherein the voltage circuit is configured to provide high voltage power to a light fixture near the ceiling of the building.

16. The system of claim 14, wherein the electrical power circuit is routed through the building via a sectional cable scheme, and the connecting portion is configured to plug into the sectional cable scheme.

17. The system of claim 14, wherein the power converter device is configured to route voltage modified power from the voltage modifier to an end use application.

18. The system of claim 14, wherein the voltage modifier includes a step down voltage transformer that is configured to convert a primary alternating current (AC) voltage from the electrical power circuit into a secondary AC voltage that is lower than the primary AC voltage.

19. The system of claim 14, wherein the voltage modifier includes a step down voltage transformer and a rectifier that is configured to convert a primary alternating current (AC) voltage from the electrical power circuit into a secondary direct current (DC) voltage that is lower than the primary AC voltage.

20. The system of claim 14, wherein the voltage modifier includes an LED driver that is configured to convert a primary AC voltage from the electrical power circuit into a secondary DC voltage.

21. The system of claim 14, wherein the voltage modifier includes an uninterrupted power supply that is configured to store the power from the electrical power circuit.

22. The system of claim 14, wherein the attaching portion is configured to mount onto a ceiling grid of the building.

23. The system of claim 14, wherein the attaching portion is configured to suspend from the ceiling of the building via a plurality of supports.

* * * * *